US009595203B2

(12) United States Patent
Osemlak

(10) Patent No.: US 9,595,203 B2
(45) Date of Patent: Mar. 14, 2017

(54) SYSTEMS AND METHODS OF SOUND RECOGNITION

(71) Applicant: David Michael Osemlak, Wyandotte, MI (US)

(72) Inventor: David Michael Osemlak, Wyandotte, MI (US)

( * ) Notice: Subject to any disclaimer, the term of this patent is extended or adjusted under 35 U.S.C. 154(b) by 0 days.

(21) Appl. No.: 14/726,393

(22) Filed: May 29, 2015

(65) Prior Publication Data

US 2016/0351066 A1 Dec. 1, 2016

(51) Int. Cl.
G10H 7/00 (2006.01)
G09B 15/00 (2006.01)
G10L 25/60 (2013.01)

(52) U.S. Cl.
CPC .............. G09B 15/00 (2013.01); G10H 7/00 (2013.01); G10L 25/60 (2013.01); G10H 2210/066 (2013.01)

(58) Field of Classification Search
USPC ........................................................ 84/470 R
IPC .......................................................... G10H 7/00
See application file for complete search history.

(56) References Cited

U.S. PATENT DOCUMENTS

| 5,889,224 | A * | 3/1999 | Tanaka | G10H 1/361 434/307 A |
| 7,304,229 | B2 * | 12/2007 | Chang | G10H 1/361 434/307 A |
| 7,554,026 | B2 * | 6/2009 | de Moraes | G10H 1/361 84/601 |
| 7,806,759 | B2 * | 10/2010 | McHale | A63F 13/10 463/7 |
| 8,148,621 | B2 * | 4/2012 | Bright | G10H 1/366 434/307 A |
| 8,357,848 | B2 * | 1/2013 | Andrews | G10H 1/40 463/7 |
| 8,380,331 | B1 * | 2/2013 | Smaragdis | G10L 25/90 700/94 |
| 8,690,670 | B2 * | 4/2014 | Kay | A63F 13/10 463/31 |
| 8,802,953 | B2 * | 8/2014 | Bright | G10H 1/366 434/307 A |
| 2004/0177744 | A1 * | 9/2004 | Strasser | G09B 19/00 84/470 R |
| 2005/0115383 | A1 * | 6/2005 | Chang | G10H 1/361 84/616 |
| 2005/0252362 | A1 * | 11/2005 | McHale | G10H 1/368 84/616 |
| 2005/0255914 | A1 * | 11/2005 | McHale | A63F 13/10 463/31 |
| 2006/0009979 | A1 * | 1/2006 | McHale | A63F 13/10 704/270 |

(Continued)

Primary Examiner — David Warren
(74) Attorney, Agent, or Firm — Dunlap Bennett & Ludwig PLLC

(57) ABSTRACT

An entertaining and engaging voice system of sound recognition embodying a method for improving a user's vocal performance by comparing the user's voice to that of a famous voice is presented. The voice system may include at least one database and a sound recognition application for storing, accessing, analyzing and processing vocal presentations of the user and recorded music or polyphonic sounds of famous vocalists so as to match and compare the user's vocal presentation thereto for improving their vocal performance.

5 Claims, 2 Drawing Sheets

(56) References Cited

U.S. PATENT DOCUMENTS

| | | | |
|---|---|---|---|
| 2007/0234888 A1* | 10/2007 | Rotolo de Moraes | G10H 1/361 84/730 |
| 2007/0234889 A1* | 10/2007 | Rotolo de Moraes | G10H 1/361 84/730 |
| 2009/0075711 A1* | 3/2009 | Brosius | A63F 13/10 463/7 |
| 2009/0104956 A1* | 4/2009 | Kay | A63F 13/10 463/7 |
| 2009/0193959 A1* | 8/2009 | Mestres | G10H 1/0008 84/609 |
| 2010/0126331 A1* | 5/2010 | Golovkin | G10H 1/361 84/610 |
| 2010/0192752 A1* | 8/2010 | Bright | G10H 1/366 84/610 |
| 2011/0146478 A1* | 6/2011 | Andrews | G10H 1/40 84/611 |
| 2012/0165086 A1* | 6/2012 | Bright | G10H 1/366 463/7 |
| 2015/0310850 A1* | 10/2015 | Nakano | G10L 13/10 704/258 |

* cited by examiner

SYSTEMS AND METHODS OF SOUND RECOGNITION

BACKGROUND OF THE INVENTION

The present invention relates to systems and methods of sound recognition and, more particularly, to an entertaining and engaging system of sound recognition embodying a method for improving a user's vocal performance by comparing the user's voice to that of a famous voice.

Individuals interested in improving their vocal performance currently have to choose to ply learning methods that are typically subjective, hit or miss, lengthy and difficult for students without musical training.

As can be seen, there is a need for an entertaining and engaging system of sound recognition embodying a method for improving a user's vocal performance by comparing the user's voice to that of a famous voice.

SUMMARY OF THE INVENTION

In one aspect of the present invention, a method of improving vocal performance includes recording a vocal presentation of a user; recognizing a predetermined range of octaves embodied in the vocal presentation; analyzing a plurality of polyphonic sounds so as to associate at least one vocalist of the plurality of polyphonic sounds who shares a portion of the predetermined range of octaves; and identifying at least one deficiency in the range of octaves of the vocal presentation in comparison to that of the at least one identified vocalist, whereby the user can work on improving the at least one deficiency in the range of octaves.

In another aspect of the present invention, a system of improving vocal performance includes a computer having a user interface; and a program product having machine-readable program code for causing, when executed, the computer to perform the following process steps: providing at least one database for storing a plurality of polyphonic sounds; providing a sound recognition application configured to process sung and spoken speaking sounds so to analyze them vis-à-vis the plurality of polyphonic sounds; prompting a user to perform a vocal presentation embodying at least one of the following: sung and spoken sounds; recognizing a predetermined range of octaves embodied in the vocal presentation; analyzing the plurality of polyphonic sounds so as to associate at least one vocalist of the plurality of polyphonic sounds who shares a portion of the predetermined range of octaves; and identifying at least one deficiency in the range of octaves of the vocal presentation in comparison to that of the at least one identified vocalist, whereby the user can work on improving the at least one deficiency in the range of octaves.

These and other features, aspects and advantages of the present invention will become better understood with reference to the following drawings, description and claims.

DETAILED DESCRIPTION OF THE INVENTION

Figure 1:
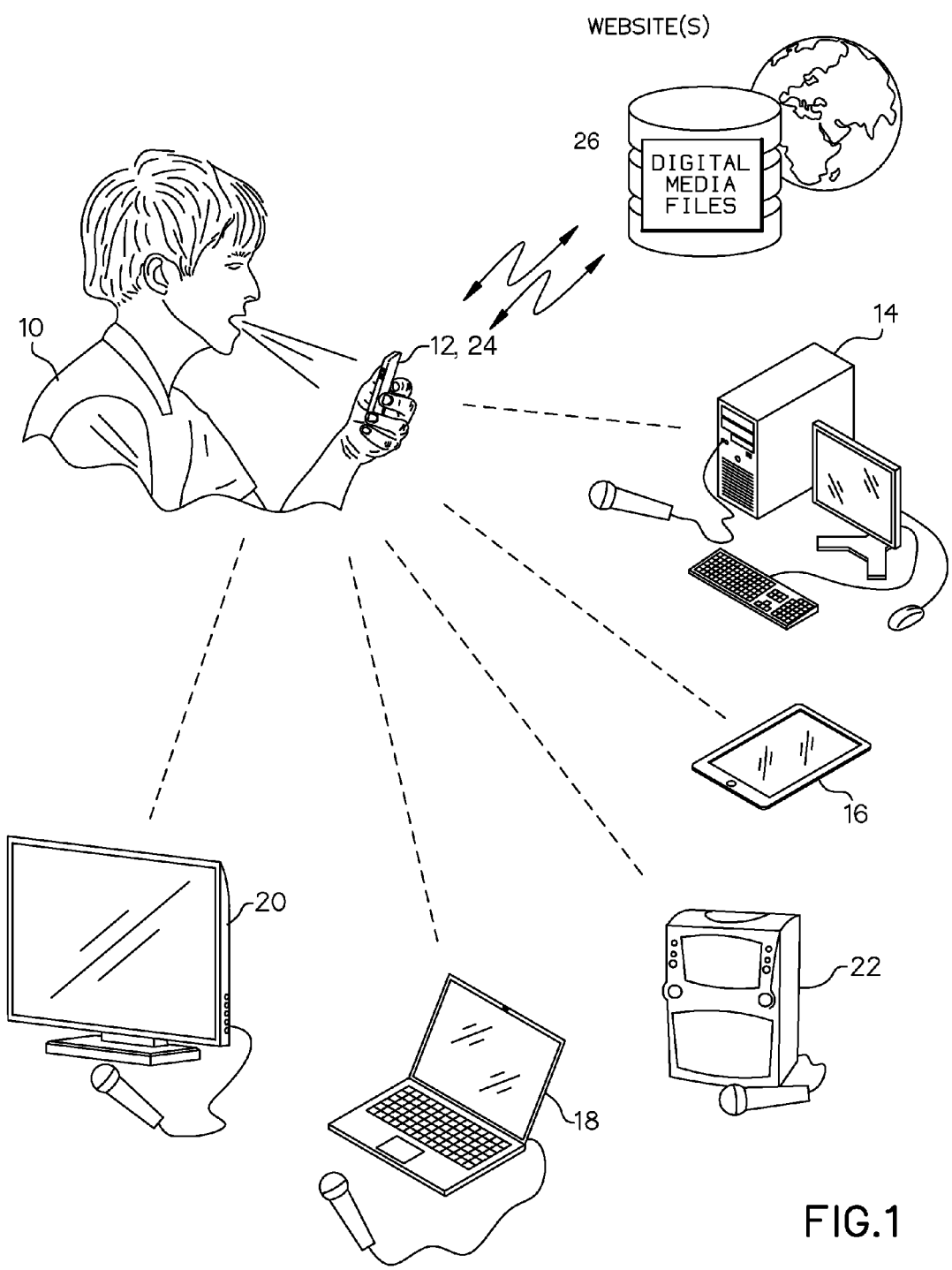
FIG. 1 is a schematic view of an exemplary embodiment of the present invention, shown in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an entertaining and engaging voice system of sound recognition embodying a method for improving a user's vocal performance by comparing the user's voice to that of a famous voice. The voice system may include at least one database and a sound recognition application for storing, accessing, analyzing and processing vocal presentations of the user and recorded music or polyphonic sounds of famous vocalists so as to match and compare the user's vocal presentation thereto for improving their vocal performance.

The present invention may include at least one computing device 24 with a user interface. The computing device 24 may include at least one processing unit and a form of memory, but not limited to, a desktop computer 14, laptop 16, a karaoke machine 22 and smart device, such as, a tablet 16, a smart TV 20, smart phone 12 and the like. The computing device 24 includes a program product including a machine-readable program code for causing, when executed, the computing device 24 to perform steps. The program product may include software which may either be loaded onto the computer or accessed by the computing device 24. The loaded software may include an application on a smart device. The software may be accessed by the computer using a web browser. The computing device 24 may access the software via the web browser using the internet, extranet, intranet, host server, internet cloud and the like.

Figure 2:
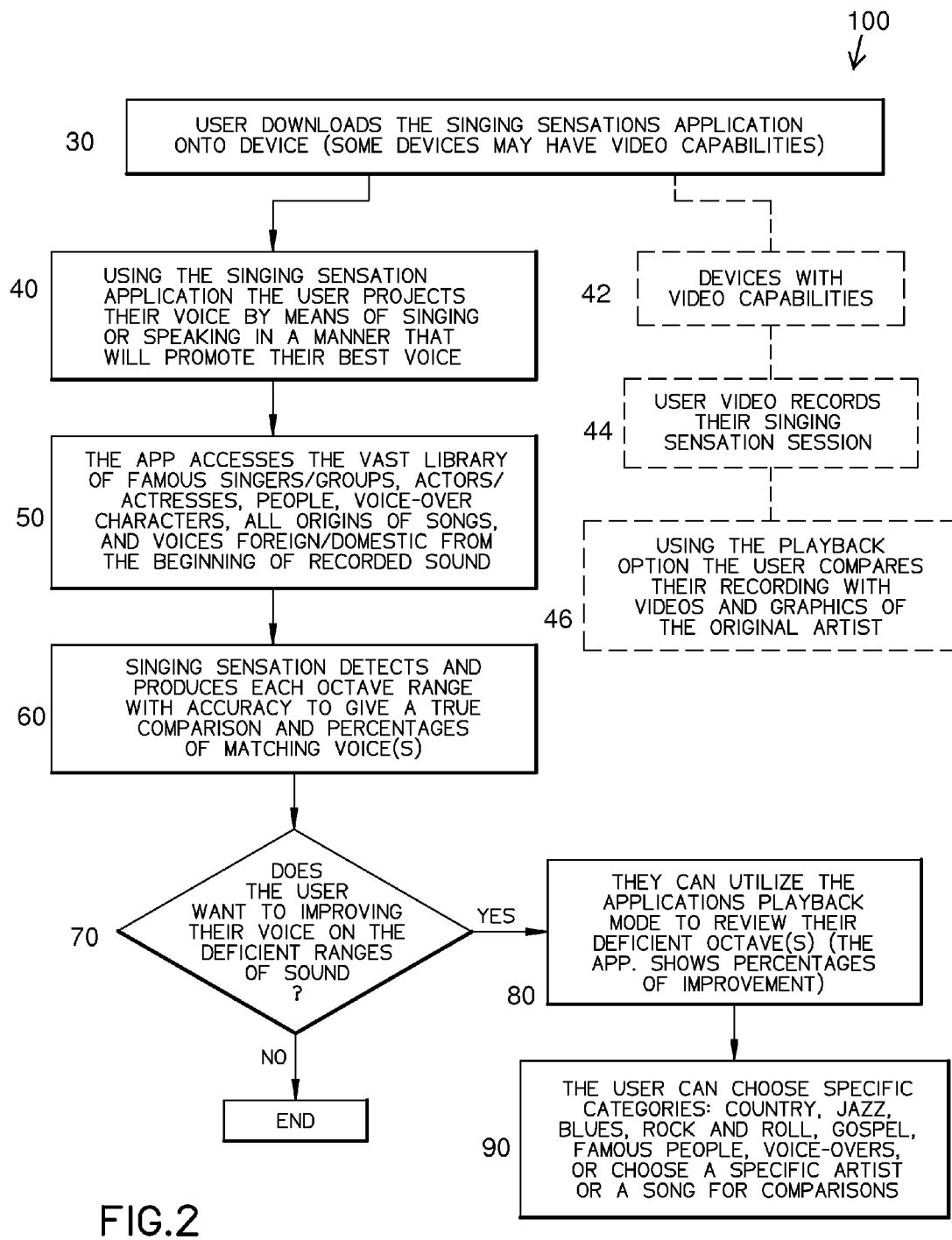
FIG. 2 is a flow chart of an exemplary embodiment of the present invention, illustrating how it is used.

Referring to FIGS. 1 and 2, the present invention may include the voice system 100. The voice system 100 may include at least one database 26 and a sound recognition application. The at least one database 26 may be remotely accessible to the computing device 24 via the above-mentioned web browser. The at least one database 26 may be adapted to store vocal performances, such as singing and speaking sounds and associated data. The at least one database 26 may be adapted to store recorded music or polyphonic sounds (such as songs, song snippets, song clips, and the like) and associated data (such as music lyrics, artists, albums, album names, biographical information of artists, and the like).

The sound recognition application may be adapted to process sung and spoken sounds so as to communicate with the at least one database 26 to search or otherwise analyze singing and spoken sounds. The sound recognition application may be adapted to process recorded music or polyphonic sounds, and communicate with the at least one database 26 to process, search or otherwise analyze recorded music or polyphonic sounds. The sound recognition application may include a playback mode enabling a user 10 to play back earlier stored singing and speaking sounds.

The method of using the present invention may include the following. The voice system 100 disclosed above may be provided. In an initial step 30, a user 10 may download the voice system 100 onto the computing device 24. Using the sound recognition application, in step 40, the user 10 may generate a vocal presentation by means of signing of speaking in a manner that will promote their best vocal performance, as illustrated in FIG. 1. The sound recognition application analyzes the voice presentation to define a predetermined spectrum of the sounds embodied by the vocal presentation. The predetermined spectrum may include octaves and other vocal characteristics.

In step 50, the sound recognition application may access the at least one database 30 so as to associate or match the predetermined spectrum to the stored recorded music or polyphonic sounds. Specifically, the recorded music or polyphonic sounds include at least one famous (professionally known persona) singer, group, actor, actress, person, voice-over character, as well as all origins of songs and voices, foreign and domestic, from the beginning of recorded sound.

In step 60, the sound recognition application may detect and produce an electronic representation on the user interface of the predetermined spectrum, including each octave range, along with the associated or matched recorded music or polyphonic sounds. Such electronic representation may include statistical analysis between, say, the octave ranges of the predetermined spectrum and the associated/matched recorded music or polyphonic sounds so as to provide an accurate comparison and percentage of accurate matching.

In step 70, the sound recognition application may prompt the user 10 if they desire to improve their vocal performance on the deficient ranges of sound. If the user 10 responds negatively 'No,' the process ends. If the user 10 responds positively ('Yes'), then the user 10 can utilize the playback mode to review their deficient octaves. The sound recognition application may prompt the user 10 for subsequent vocal presentations. Said subsequent vocal presentations may be processed by the sound recognition application so as to electronically represent percentage of improvements among the plurality of predetermined spectrums as well as vis-a-vis the associated/matched recorded music or polyphonic sounds, in step 80.

In certain embodiments, in step 90, the user 10 can choose specific musical genres of recorded music or polyphonic sounds and predetermined famous vocalists for filtering which of the recorded music or polyphonic sounds would be subject to association and matching. For example, the user 10 may choose from a list including gospel, rock and roll, blues, jazz prior to the sound recognition application's step 50.

In certain embodiments, the computing device 24 may have video capabilities, for example wherein its user interface is enabled to graphically represent videos and other graphics, in step 42. In such embodiments, the user may video record their vocal projection in step 44. In step 46, the user may utilize the playback mode to compare their video record with the video and graphics of the original artist.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A method of improving vocal performance, comprising:
   providing a database of a plurality of vocal presentations;
   recording at least one user vocal presentation of a user;
   recognizing a spectrum of vocal characteristics embodied in the at least one user vocal presentation, wherein the spectrum of vocal characteristics includes a range of the at least one user vocal presentation;
   comparing the at least one user vocal presentation to the plurality of vocal presentations;
   associating one of the plurality of vocal presentations to the at least one user vocal presentation based in part on a percentage of matching between the respective spectrum of vocal characteristics of the at least one user vocal presentation and said one of the plurality of vocal presentations; and
   identifying at least one deficiency in the at least one user vocal presentation, wherein the at least one deficiency is defined by the percentage of matching,
   whereby the at least one deficiency is represented to the user for self-improvement purposes.

2. The method of claim 1, wherein the at least one vocal presentation comprises singing and speech sounds.

3. The method of claim 1, further comprising filtering the plurality of vocal presentations by a musical genre.

4. The method of claim 1, further comprising electronically representing the percentage of matching, whereby the user can verify the accuracy of the association.

5. The method of claim 1, further comprising prompting the user to record subsequent user vocal presentations so as to determine a change in the at least one deficiency vis-à-vis earlier user vocal presentations.

* * * * *